(12) United States Patent
Nijasure et al.

(10) Patent No.: US 11,010,862 B1
(45) Date of Patent: May 18, 2021

(54) REDUCED BANDWIDTH TESSELLATION FACTORS

(71) Applicant: ADVANCED MICRO DEVICES, INC., Santa Clara, CA (US)

(72) Inventors: Mangesh P. Nijasure, Orlando, FL (US); Tad Litwiller, Orlando, FL (US); Todd Martin, Orlando, FL (US); Nishank Pathak, Orlando, FL (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/683,868

(22) Filed: Nov. 14, 2019

(51) Int. Cl.
 *G06T 1/20* (2006.01)
 *G06F 9/38* (2018.01)
 *G06F 9/48* (2006.01)
 *G06T 15/00* (2011.01)

(52) U.S. Cl.
 CPC .............. *G06T 1/20* (2013.01); *G06F 9/3877* (2013.01); *G06F 9/4881* (2013.01); *G06T 15/005* (2013.01)

(58) Field of Classification Search
 None
 See application file for complete search history.

(56) References Cited

U.S. PATENT DOCUMENTS

| | | | |
|---|---|---|---|
| 10,037,625 B2 * | 7/2018 | Akenine-Moller | G06T 1/20 |
| 10,229,536 B2 * | 3/2019 | Lacey | G06T 15/80 |
| 2005/0193050 A1 | 9/2005 | Sazegari | |
| 2010/0274990 A1 | 10/2010 | Wilder et al. | |

(Continued)

FOREIGN PATENT DOCUMENTS

| | | |
|---|---|---|
| KR | 10-2014-0098133 A | 8/2014 |
| KR | 10-2016-0063079 A | 6/2016 |

(Continued)

OTHER PUBLICATIONS

International Search Report and Written Opinion for counterpart Application No. PCT/US2020/052211 dated Jan. 8, 2021, 9 pages.

(Continued)

*Primary Examiner* — Ryan M Gray

(57) ABSTRACT

A graphics pipeline reduces the number of tessellation factors written to and read from a graphics memory. A hull shader stage of the graphics pipeline detects whether at least a threshold percentage of the tessellation factors for a thread group of patches are the same and, in some embodiments, whether at least the threshold percentage of the tessellation factors for a thread group of patches have a same value that either indicates that the plurality of patches are to be culled or that the plurality of patches are to be passed to a tessellator stage of the graphics pipeline. In response to detecting that at least the threshold percentage of the tessellation factors for the thread group are the same (or, additionally, that at least the threshold percentage of the tessellation factors have a value that either indicates that the plurality of patches are to be culled or that the plurality of patches are to be passed to a tessellator stage of the graphics pipeline), the hull shader stage bypasses writing at least a subset of the tessellation factors for the thread group of patches to the graphics memory, thus reducing bandwidth and increasing efficiency of the graphics pipeline.

20 Claims, 7 Drawing Sheets

(56) References Cited

U.S. PATENT DOCUMENTS

| | | | |
|---|---|---|---|
| 2013/0257891 A1* | 10/2013 | Sathe | G06T 15/005 |
| | | | 345/589 |
| 2014/0365548 A1 | 12/2014 | Mortensen | |
| 2015/0015580 A1* | 1/2015 | Kim | G06T 17/20 |
| | | | 345/423 |
| 2015/0022520 A1* | 1/2015 | Kim | G06T 1/60 |
| | | | 345/423 |
| 2015/0161757 A1* | 6/2015 | Li | G06T 15/80 |
| | | | 345/423 |
| 2017/0091986 A1* | 3/2017 | Fishwick | G06T 17/10 |
| 2017/0358132 A1* | 12/2017 | Munshi | G06T 15/005 |
| 2018/0060995 A1* | 3/2018 | Doyle | G06T 17/20 |
| 2018/0075650 A1* | 3/2018 | Akenine-Moller | G06T 1/20 |
| 2018/0301189 A1 | 10/2018 | Hu et al. | |
| 2019/0272613 A1 | 9/2019 | Sharma et al. | |
| 2019/0311536 A1 | 10/2019 | Lacey et al. | |
| 2019/0311537 A1* | 10/2019 | Fenney | G06T 17/205 |
| 2020/0005524 A1* | 1/2020 | Yang | G06T 1/20 |
| 2020/0013139 A1* | 1/2020 | Fishwick | G06T 1/00 |

FOREIGN PATENT DOCUMENTS

| | | |
|---|---|---|
| KR | 10-2017-0027325 | 3/2017 |
| KR | 10-2017-0058113 A | 5/2017 |

OTHER PUBLICATIONS

Written Opinion of the International Searching Authority dated Mar. 9, 2021 for PCT Application No. PCT/US2020/060506, 8 pages.

* cited by examiner

REDUCED BANDWIDTH TESSELLATION FACTORS

BACKGROUND

A graphics processing unit (GPU) processes three-dimensional (3-D) graphics using a graphics pipeline formed of a sequence of programmable shaders and fixed-function hardware blocks. For example, a 3-D model of an object that is visible in a frame can be represented by a set of triangles, other polygons, or patches which are processed in the graphics pipeline to produce values of pixels for display to a user. The triangles, other polygons, or patches are collectively referred to as primitives. The process includes mapping tessellation factors to the primitives to represent finer levels of detail as indicated by the tessellation factors that specify the granularity of the primitives produced by a tessellation process. The GPU includes a dedicated memory that is used to store tessellation factors so that the tessellation factors are available for mapping to primitives that are being processed in the graphics pipeline. The tessellation factors stored in the dedicated GPU memory are populated by procedurally generating the data. The dedicated GPU memory is typically a relatively small memory, which limits the amount of tessellation factors that can be stored in the dedicated GPU memory. Furthermore, the overhead required to write the tessellation factors to and read the tessellation factors from memory can be significant.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
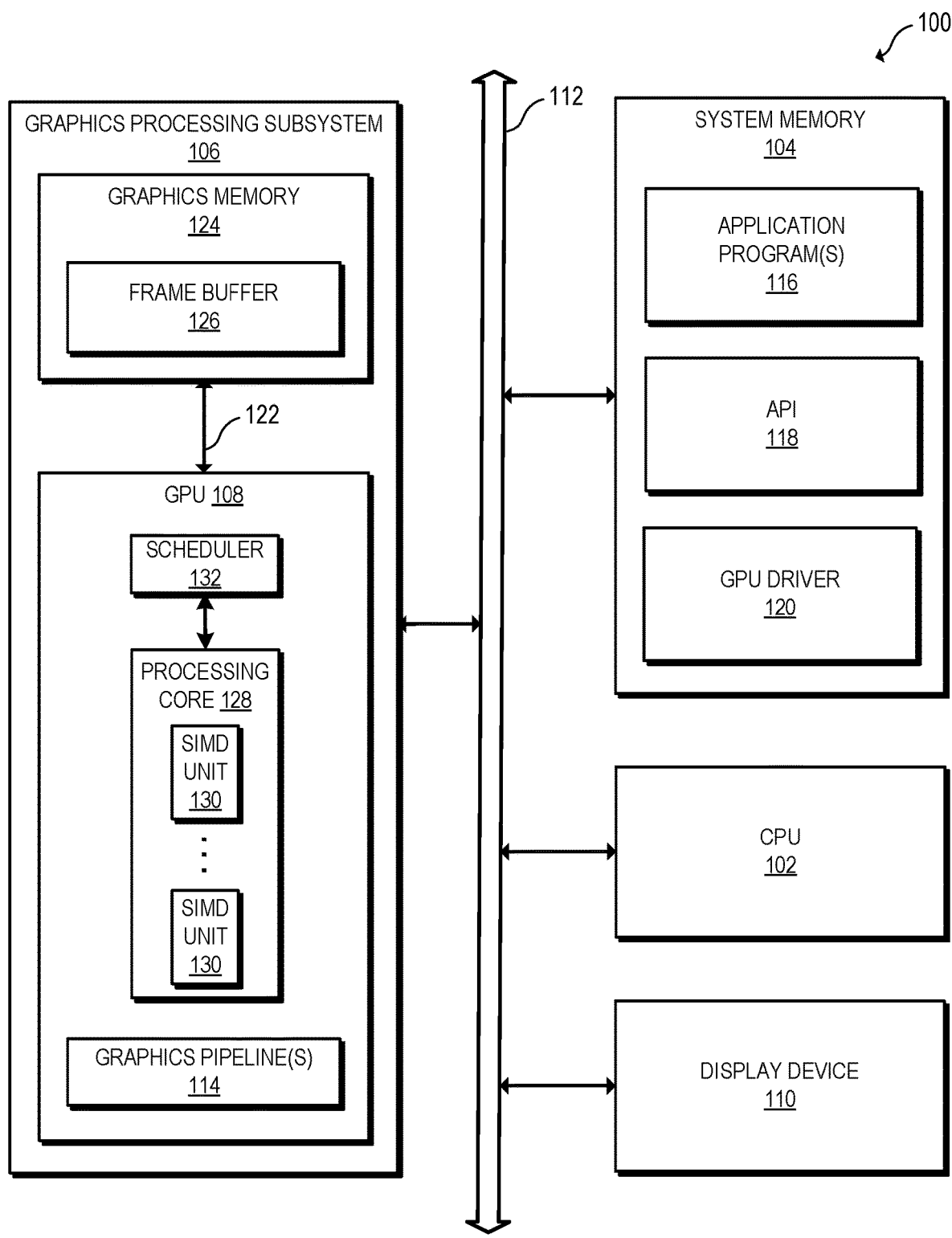
FIG. 1 is a block diagram of a processing system that includes a graphics processing unit (GPU) for creating visual images intended for output to a display in accordance with some embodiments.

A graphics pipeline for processing three-dimensional (3-D) graphics is formed of a sequence of fixed-function hardware block arrangements supported by programmable shaders and a memory. These arrangements are usually specified by a graphics application programming interface (API) processing order such as specified in specifications of Direct 3D 11, Microsoft DX 11/12 or Khronos Group OpenGL/Vulkan APIs. One example of a graphics pipeline includes a geometry front-end that is implemented using a vertex shader and a hull shader that operate on high order primitives such as patches that represent a 3-D model of a scene.

The geometry front-end provides the high order primitives like curved surface patches and tessellation factors generated by the hull shader to a tessellator that is implemented as a fixed function hardware block in some embodiments. Tessellation allows detail to be dynamically added and subtracted from a 3D polygon mesh based on control parameters. The tessellator generates lower order primitives (such as triangles, lines, and points) from the input higher order primitives based on tessellation parameters (also referred to herein as tessellation factors) which control the degree of fineness of the 3D polygon mesh. The tessellation allows for producing smoother surfaces than would be generated by the original 3D polygon mesh. Lower order primitives such as polygons are formed of interconnected vertices. For example, common objects like meshes include a plurality of triangles formed of three vertices. The lower order primitives are provided to a geometry back-end that includes a geometry shader to replicate, shade or subdivide the lower order primitives. For example, massive hair generation can be provided via functionality of the geometry shader.

Vertices of the primitives generated by the portion of the graphics pipeline that handles the geometry workload in object space are then provided to the portion that handles pixel workloads in image space, e.g., via primitive, vertex, and index buffers as well as cache memory buffers. The pixel portion includes the arrangements of fixed function hardware combined with programmable pixel shaders to perform culling, rasterization, depth testing, color blending, and the like on the primitives to generate fragments or pixels from the input geometry primitives. The fragments are individual pixels or subpixels in some cases. A programmable pixel shader then shades the fragments to merge with scene frame image for display.

FIGS. 1-7 disclose systems and techniques to improve the efficiency and bandwidth of graphics processing pipelines. In some embodiments, a method of bypassing writing tessellation factors to and reading tessellation factors from a graphics memory includes detecting, at a hull shader of a graphics processing pipeline of a graphics processing unit (GPU), whether all the tessellation factors for a patch, or at least a threshold percentage of the tessellation factors for all patches in a thread group, have the same value, and whether at least a threshold percentage of the tessellation factors indicates either that the patches of the thread group are to be culled or that the patches of the thread group are to be passed to the tessellator. If at least the threshold percentage of the tessellation factors for a thread group indicate that the patches of the thread group are to be culled (referred to herein as having tessellation factors with a value of zero), the hull shader bypasses writing the tessellation factors to the graphics memory and sends a message to the patch fetcher indicating that the tessellation factors for the thread group are to be discarded. In response to receiving the message, the patch fetcher bypasses reading tessellation factors for the thread group from the graphics memory and discards the patches of the thread group.

If the hull shader determines that at least the threshold percentage of the tessellation factors for the thread group indicates that the patches of the thread group are to be passed to the tessellator stage (referred to herein as having tessellation factors with a value of one), the hull shader bypasses writing the tessellation factors for the thread group to the graphics memory and sends a message to the patch fetcher indicating that all of the tessellation factors for the thread group are indicate that the patches of the thread group are to be passed to the tessellator stage. In response to receiving the message, the patch fetcher bypasses reading the tessellation factors from the graphics memory and provides the patches of the thread group to the tessellator stage.

In some embodiments, if the hull shader determines that at least the threshold percentage of the tessellation factors for the thread group have values that are equal to each other but that are neither zero nor one, the hull shader writes a single instance of the value of the tessellation factors to the memory and sends a message to the patch fetcher indicating that the single value of the tessellation factors stored at the graphics memory applies to all of the tessellation factors for the patches of the thread group. In response to receiving the message, the patch fetcher reads the single tessellation factor from the graphics memory and applies the single tessellation factor to each of the patches in the thread group before providing the patches to the tessellator.

If the tessellation factors for the patches of the thread group do not have values that are equal to each other, in some embodiments, the hull fetcher performs integer compression to write more than one compressed tessellation factor for a patch in a single word to the graphics memory. For example, an isoline patch is associated with two tessellation factors. Thus, in some embodiments, the hull fetcher writes both tessellation factors for an isoline patch in a single word to the graphics memory. Similarly, a triangle patch is associated with four tessellation factors. In some embodiments, the hull fetcher writes all four tessellation factors associated with a triangle patch in a single word to the graphics memory. A quad patch is associated with six tessellation factors. In some embodiments, the hull fetcher writes the first three tessellation factors associated with a quad patch in a first single word to the graphics memory and writes the remaining three tessellation factors associated with the quad patch in a second single word to the graphics memory.

Each patch primitive type (e.g., isoline, triangle, and quad) is associated with either two, four, or six tessellation factors. Particularly for tessellation factors equal to zero or one, more bandwidth can be consumed writing and reading the tessellation factors to and from the graphics memory than is saved by any reduction in granularity of the tessellated primitives that are produced using the tessellation factors. By reducing the amount of data written to and read from the graphics memory, the graphics processing pipeline improves bandwidth and efficiency of the GPU.

FIG. 1 is a block diagram of a processing system 100 for implementing reduced bandwidth tessellation factors in accordance with some embodiments. The processing system 100 includes a central processing unit (CPU) 102, a system memory 104, a graphics processing subsystem 106 including a graphics processing unit (GPU) 108, and a display device 110 communicably coupled together by a system data bus 112. As shown, the system data bus 112 connects the CPU 102, the system memory 104, and the graphics processing subsystem 106. In other embodiments, the system memory 104 connects directly to the CPU 102. In some embodiments, the CPU 102, portions of the graphics processing subsystem 106, the system data bus 112, or any combination thereof, is integrated into a single processing unit. Further, in some embodiments, the functionality of the graphics processing subsystem 106 is included in a chipset or in some other type of special purpose processing unit or co-processor.

The CPU 102 executes programming instructions stored in the system memory 104, operates on data stored in the system memory 104, sends instructions and/or data (e.g., work or tasks to complete) to the graphics processing unit 108 to complete, and configures portions of the graphics processing subsystem 106 for the GPU 108 to complete the work. In some embodiments, the system memory 104 includes dynamic random access memory (DRAM) for storing programming instructions and data for processing by the CPU 102 and the graphics processing subsystem 106.

In various embodiments, the CPU 102 sends instructions intended for processing at the GPU 108 to command buffers. In some embodiments, the command buffer is located, for example, at system memory 104 coupled to the system data bus 112. In other embodiments, the CPU 102 sends graphics commands intended for the GPU 108 to a separate memory communicably coupled to the system data bus 112. The command buffer temporarily stores a stream of graphics commands that include input to the GPU 108. The stream of graphics commands includes, for example, one or more command packets and/or one or more state update packets. In some embodiments, a command packet includes a draw command (also interchangeably referred to as a "draw call") instructing the GPU 108 to execute processes on image data to be output for display. For example, a draw command instructs the GPU 108 to render pixels defined by a group of one or more vertices (e.g., defined in a vertex buffer) stored in memory. The geometry defined by the group of one or more vertices corresponds, in some embodiments, to a plurality of primitives to be rendered.

The GPU 108 receives and processes work transmitted from the CPU 102. For example, in various embodiments, the GPU 108 processes the work to render and display graphics images on the display device 110, such as by using one or more graphics pipelines 114. The graphics pipeline 114 includes fixed function stages and programmable shader stages. The fixed function stages include typical hardware stages included in a fixed function pipeline of a GPU. The programmable shader stages include streaming multiprocessors. Each of the streaming multiprocessors is capable of executing a relatively large number of threads concurrently. Further, each of the streaming multiprocessors is programmable to execute processing tasks relating to a wide variety of applications, including but not limited to linear and nonlinear data transforms, filtering of video and/or audio data, modeling operations (e.g., applying of physics to determine position, velocity, and other attributes of objects), and so on. In other embodiments, the graphics processing subsystem 106 is used for non-graphics processing.

As also shown, the system memory 104 includes an application program 116 (e.g., an operating system or other application), an application programming interface (API) 118, and a GPU driver 120. The application program 116 generates calls to the API 118 for producing a desired set of results, typically in the form of a sequence of graphics images. The graphics processing subsystem 106 includes a GPU data bus 122 that communicably couples the GPU 108 to a graphics memory 124. In various embodiments, the GPU uses graphics memory 124 and system memory 104, in any combination, for memory operations. The CPU 102 allocates portions of these memories for the GPU 108 to execute work. For example, in various embodiments, the GPU 108 receives instructions from the CPU 102, processes the instructions to render graphics data and images, and stores images in the graphics memory 124. Subsequently, the GPU 108 displays graphics images stored in the graphics memory 124 on the display device 110. The graphics memory 124 stores data and programming used by the GPU 108. As illustrated in FIG. 1, the graphics memory 124 includes a frame buffer 126 that stores data for driving the display device 110.

In various embodiments, the GPU 108 includes one or more compute units, such as one or more processing cores 128 that include one or more processing units 130 that execute a thread concurrently with execution of other threads in a wavefront, such as according to a single-instruction, multiple-data (SIMD) execution model. The processing units 130 are also interchangeably referred to as SIMD units. The SIMD execution model is one in which multiple processing elements share a single program control flow unit and program counter and thus execute the same program but are able to execute that program with different data. The processing cores 128 of the GPU 108 are also interchangeably referred to as shader cores or streaming multi-processors (SMXs). The number of processing cores 128 that are implemented in the GPU 108 is a matter of design choice.

Each of the one or more processing cores 128 executes a respective instantiation of a particular work-item to process incoming data, where the basic unit of execution in the one or more processing cores 128 is a work-item (e.g., a thread). Each work-item represents a single instantiation of, for example, a collection of parallel executions of a kernel invoked on a device by a command that is to be executed in parallel. A work-item is executed by one or more processing elements as part of a thread group (e.g., a work-group) executing at a processing core 128. In various embodiments, the GPU 108 issues and executes single processing unit 130. Multiple wavefronts are included in a "thread group," which includes a collection of work-items designated to execute the same program. A thread group is executed by executing each of the wavefronts that make up the thread group. In some embodiments, the wavefronts are executed sequentially on a single processing unit 130 or partially or fully in parallel on different SIMD units. In other embodiments, all wavefronts from a thread group are processed at the same processing core 128. Wavefronts are also interchangeably referred to as warps, vectors, or threads. In some embodiments, wavefronts include instances of parallel execution of a shader program, where each wavefront includes multiple work-items that execute simultaneously on a single processing unit 130 in line with the SIMD paradigm (e.g., one instruction control unit executing the same stream of instructions with multiple data). A scheduler 132 performs operations related to scheduling various wavefronts on different processing cores 128 and processing units 130, as well as performing other operations for orchestrating various tasks on the graphics processing subsystem 106.

The parallelism afforded by the one or more processing cores 128 is suitable for graphics related operations such as pixel value calculations, vertex transformations, tessellation, geometry shading operations, and other graphics operations. The graphics pipeline 114 accepts graphics processing commands from the CPU 102 and thus provides computation tasks to the one or more processing cores 128 for execution in parallel. Some graphics pipeline operations, such as pixel processing and other parallel computation operations, require that the same command stream or compute kernel be performed on streams or collections of input data elements. Respective instantiations of the same compute kernel are executed concurrently on multiple processing units 130 in the one or more processing cores 128 in order to process such data elements in parallel. As referred to herein, for example, a compute kernel is a function containing instructions declared in a program and executed on a processing core 128. This function is also referred to as a kernel, a shader, a shader program, or a program.

As described below in more detail with respect to FIG. 2, the GPU 108 includes a graphics pipeline 114 that reduces the number of tessellation factors written to and read from the graphics memory 124. Abstract patch types include isoline, triangle, and quad. An isoline patch is a horizontal line defined by two tessellation factors. A triangle patch is a triangle defined by three outer tessellation factors and one inner tessellation factor, for a total of four tessellation factors. A quad patch is a square defined by four outer tessellation factors and two inner tessellation factors, for a total of six tessellation factors. In some embodiments, each tessellation factor includes 32 bits. Thus, writing all of the tessellation factors for all of the patches of a thread group to the graphics memory 124 and reading all of the tessellation factors for the patches of the thread group from the graphics memory 124 consumes significant bandwidth. The graphics pipeline 114 detects whether at least a threshold percentage of the tessellation factors for a thread group of patches are the same and, in some embodiments, whether at least the threshold percentage of the tessellation factors for a thread group of patches are either zero (i.e., indicate that the patches are to be culled) or one (i.e., indicate that the patches are to be passed to a tessellator stage of the graphics pipeline 114). In some embodiments, the threshold is programmable and is set to a relatively high value, such as 98%. In response to detecting that the threshold percentage of the tessellation factors for the thread group are the same (or, additionally in some embodiments, that the threshold percentage of the tessellation factors are either zero or one), the graphics pipeline 114 bypasses writing and reading at least a subset of the tessellation factors for the thread group of patches to and from the graphics memory 124, thus reducing bandwidth and increasing efficiency of the graphics pipeline 114.

Figure 2:
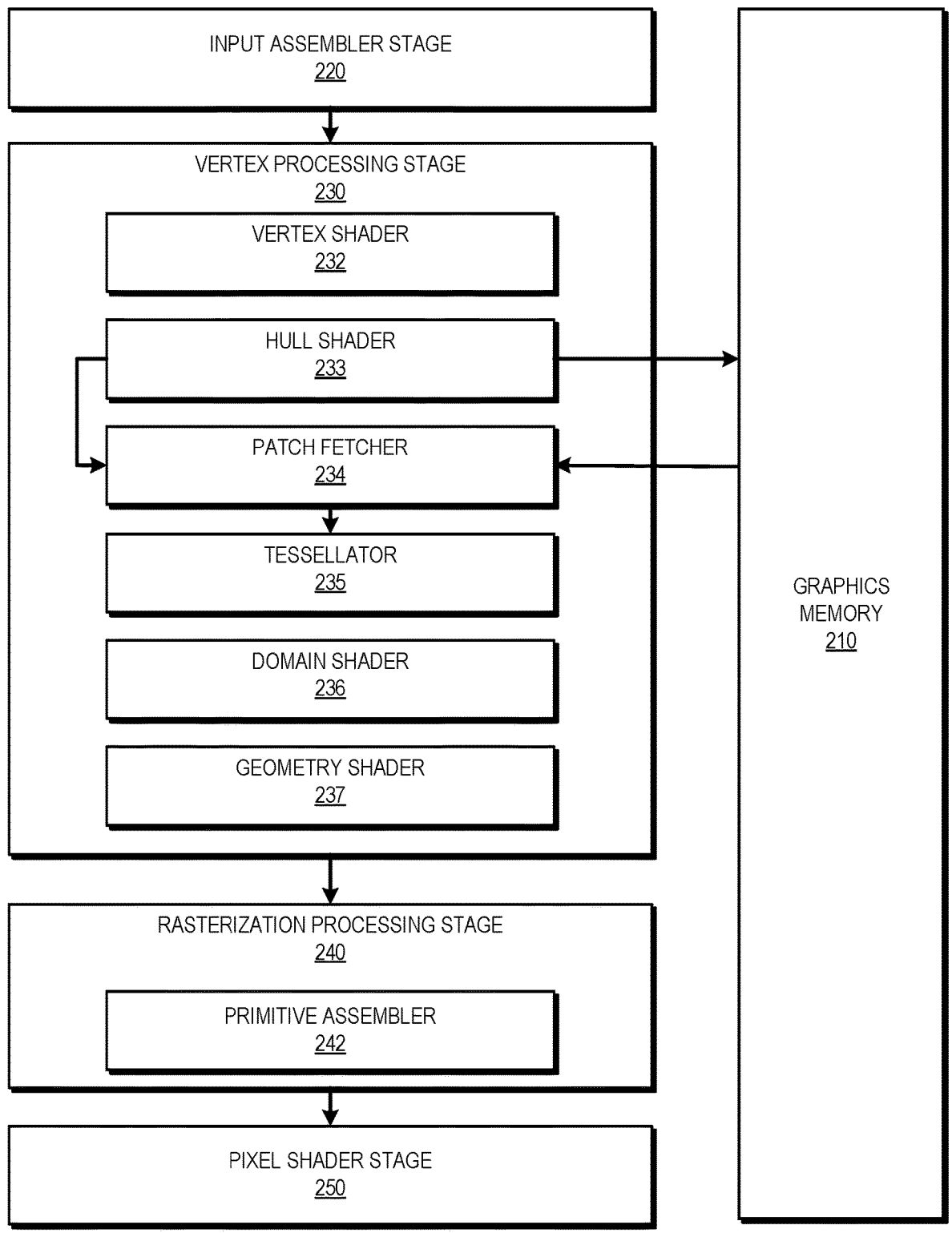
FIG. 2 depicts a graphics pipeline that is capable of processing high-order geometry primitives to generate rasterized images of three-dimensional (3D) scenes while storing and retrieving from memory a reduced amount of tessellation factors in accordance with some embodiments.

FIG. 2 depicts a graphics pipeline that is capable of processing high-order geometry primitives to generate rasterized images of three-dimensional (3D) scenes while storing and retrieving from memory a reduced amount of tessellation factors in accordance with some embodiments. FIG. 2 shows various elements and pipeline stages associated with a GPU. In some embodiments the graphics pipeline includes other elements and stages that are not illustrated in FIG. 2. It should also be noted that FIG. 2 is only schematic, and that, for example, in some embodiments in practice the shown functional units and pipeline stages share hardware circuits, even though they are shown schematically as separate stages in FIG. 2. It will also be appreciated that each of the stages, elements and units of the graphics processing pipeline 200 are implemented as desired and accordingly include, for example, appropriate circuitry and/or processing logic for performing the associated operation and functions.

In various embodiments, the graphics processing pipeline 200 is configured to render graphics as images that depict a scene which has three-dimensional geometry in virtual space (sometimes referred to herein as "world space"), but potentially a two-dimensional geometry. The graphics processing pipeline 200 typically receives a representation of a three-dimensional scene, processes the representation, and outputs a two-dimensional raster image. These stages of graphics processing pipeline 200 process data that is initially properties at end points (or vertices) of a geometric primitive, where the primitive provides information on an object being rendered. Typical primitives in three-dimensional graphics include triangles and lines, where the vertices of these geometric primitives provide information on, for example, x-y-z coordinates, texture, and reflectivity.

Throughout the graphics processing pipeline 200, data is read from and written to one or more memory units, which are generally denoted in FIG. 2 as graphics memory 210. The graphics memory 210 includes a hierarchy of one or more memories or caches that are used to implement buffers and store tessellation factors, vertex data, texture data, and the like. The graphics memory 210 is implemented using some embodiments of the system memory 104 shown in FIG. 1.

The graphics memory 210 contains video memory and/or hardware state memory, including various buffers and/or graphics resources utilized in the rendering pipeline. In various embodiments, one or more individual memory units of the graphics memory 210 is embodied as one or more video random access memory unit(s), one or more caches, one or more processor registers, and the like, depending on the nature of data at the particular stage in rendering. Accordingly, it is understood that graphics memory 210 refers to any processor accessible memory utilized in the graphics processing pipeline 200. A processing unit, such as a specialized GPU, is configured to perform various operations in the pipeline and read/write to the graphics memory 210 accordingly.

The early stages of the graphics processing pipeline 200 include operations performed in world space before a scene is rasterized and converted to screen space as a set of discrete picture elements suitable for output on the pixel display device. Throughout the graphics processing pipeline 200, various resources contained in the graphics memory 210 are utilized at the pipeline stages and inputs and outputs to the stages are temporarily stored in buffers contained in the graphics memory 210 before the final values of the images are determined.

An input assembler stage 220 is configured to access information from the graphics memory 210 that is used to define objects that represent portions of a model of a scene. For example, in various embodiments, the input assembler stage 220 reads primitive data (e.g., points, lines and/or triangles) from user-filled buffers and assembles the data into primitives that will be used by other pipeline stages of the graphics processing pipeline 200. As used herein, the term "user" refers to the application program 116 or other entity that provides shader code and three-dimensional objects for rendering to the graphics processing pipeline 200. The input assembler stage 220 assembles vertices into several different primitive types (such as line lists, triangle strips, or primitives with adjacency) based on the primitive data include in the user-filled buffers and formats the assembled primitives for use by the rest of the graphics processing pipeline 200.

In various embodiments, the graphics processing pipeline 200 operates on one or more virtual objects defined by a set of vertices set up in world space and having geometry that is defined with respect to coordinates in the scene. For example, the input data utilized in the graphics processing pipeline 200 includes a polygon mesh model of the scene geometry whose vertices correspond to the primitives processed in the rendering pipeline in accordance with aspects of the present disclosure, and the initial vertex geometry is set up in the graphics memory during an application stage implemented by a CPU.

A vertex processing stage 230 includes various computations to process the vertices of the objects in world space geometry. In some embodiments, the vertex processing stage 230 includes a vertex shader stage 232 to perform vertex shader computations, which manipulate various parameter values of the vertices in the scene, such as position values (e.g., X-Y coordinate and Z-depth values), color values, lighting values, texture coordinates, and the like. Preferably, the vertex shader computations are performed by one or more programmable vertex shaders 232. The vertex shader computations are performed uniquely for each zone that an object overlaps, and an object zone index is utilized during vertex shading to determine which rendering context and the associated parameters that the object uses, and, accordingly, how the vertex values should be manipulated for later rasterization. In various embodiments, the vertex shader stage 232 is implemented in software, logically receives a single vertex of a primitive as input, and outputs a single vertex. Some embodiments of vertex shaders implement single-instruction-multiple-data (SIMD) processing so that multiple vertices are processed concurrently.

The vertex processing stage 230 also optionally includes additional vertex processing computations, which subdivide primitives and generates new vertices and new geometries in world space. In the depicted embodiment, the vertex processing stage 230 includes a vertex shader stage 232, a hull shader stage 233, a patch fetcher 234, a tessellator stage 235, a domain shader stage 236, and a geometry shader stage 237. The hull shader stage 233 operates on input high-order patches or control points that are used to define the input patches. The hull shader stage 233 outputs tessellation factors and other patch data. Primitives generated by the hull shader stage 233 can be provided to the tessellator stage 235 by the patch fetcher 234. The tessellator stage 235 receives objects (such as patches) from the hull shader stage 233 and generates information identifying primitives corresponding to the input object, e.g., by tessellating the input objects based on tessellation factors provided to the tessellator stage 235 by the hull shader stage 233. Tessellation subdivides input higher-order primitives such as patches into a set of lower-order output primitives that represent finer levels of detail, e.g., as indicated by tessellation factors that specify the granularity of the primitives produced by the tessellation process. A model of a scene can therefore be represented by a smaller number of higher-order primitives (to save memory or bandwidth) and additional details can be added by tessellating the higher-order primitive.

The domain shader stage 236 inputs a domain location and, in some implementations, other patch data. The domain shader stage 236 operates on the provided information and generates a single vertex for output based on the input domain location and other information. A geometry shader stage 237 receives an input primitive and outputs up to four primitives that are generated by the geometry shader stage 237 based on the input primitive. In some embodiments, the geometry shader stage 237 retrieves vertex data from graphics memory 210 and generates new graphics primitives, such as lines and triangles, from the vertex data in graphics memory 210. In particular, geometry shader stage 237 retrieves vertex data for a primitive, as a whole, and generates zero or more primitives. For example, geometry shader stage 237 can operate on a triangle primitive with three vertices.

Once the vertex processing stage 230 is complete, the scene is defined by a set of vertices which each have a set of vertex parameter values stored in the graphics memory 210. In certain implementations, the vertex parameter values output from the vertex processing stage 230 include positions defined with different homogeneous coordinates for different zones.

The graphics processing pipeline 200 then proceeds to rasterization processing stages 240. The rasterization processing stages 240 perform shading operations and other operations such as clipping, perspective dividing, scissoring, and viewport selection, and the like. In various embodiments, the rasterization processing stages 240 convert the scene geometry into screen space and a set of discrete picture elements (e.g., pixels used during the graphics processing pipeline, although it is noted that the term pixel does not necessarily mean that the pixel corresponds to a display pixel value in the final display buffer image). The virtual space geometry transforms to screen space geometry through operations that compute the projection of the objects and vertices from world space to the viewing window (or "viewport") of the scene that is made up of a plurality of discrete screen space pixels sampled by the rasterizer. In accordance with aspects of the present disclosure, the screen area includes a plurality of distinct zones with different rendering parameters, which include different rasterization parameters for the different zones.

The rasterization processing stage 240 depicted in the figure includes a primitive assembly stage 242, which sets up the primitives defined by each set of vertices in the scene. Each vertex is defined by a vertex index, and each primitive is defined with respect to these vertex indices and stored in index buffers in the graphics memory 210. The primitives should include at least triangles that are defined by three vertices each, but also include point primitives, line primitives, and other polygonal shapes. During the primitive assembly stage 242, certain primitives are culled. For example, those primitives whose vertex indices and homogeneous coordinate space positions indicate a certain winding order are considered to be back-facing and therefore culled from the scene. Primitive assembly stage 242 also includes screen space transformations for the primitive vertices, which can include different screen space transform parameters for different zones of the screen area.

The rasterization processing stage 240 performs clipping, a perspective divide to transform the points into homogeneous space and maps the vertices to the viewport. The raster data is snapped to integer locations that are then culled and clipped (to draw the minimum number of pixels), and per-pixel attributes are interpolated (from per-vertex attributes). In this manner, the rasterization processing stage 240 determines which pixel primitives overlap, clips primitives and prepares primitives for the pixel shader and determines how to invoke the pixel shader stage 250.

In traditional geometry pipelines, the hull shader stage 233 writes all tessellation factors for all patches to the graphics memory 210 and the patch fetcher 234 reads all tessellation factors for all patches from the graphics memory 210, which can waste computing resources and create processing bottlenecks. For example, frequently there are large runs in which all or a high percentage of the tessellation factors are the same. The hull shader stage 233 detects whether at least a threshold percentage of the tessellation factors for a thread group of patches are the same. If at least the threshold percentage of the tessellation factors for the thread group are the same, in some embodiments the hull shader stage 233 further detects whether at least the threshold percentage of the tessellation factors for the thread group either indicate that the patches of the thread group are to be culled (e.g., have a value of zero) or indicate that the patches of the thread group are to be passed to the tessellator stage 235 (e.g., have a value of one). In response to detecting that at least the threshold percentage of the tessellation factors for the thread group are the same, the hull shader stage 233 bypasses writing at least a subset of the tessellation factors to the graphics memory 210. For example, in response to detecting that at least the threshold percentage of tessellation factors for a thread group of patches all have the same value of zero or one, the hull shader stage 233 sends a message to the patch fetcher 234. The hull shader stage 233 bypasses writing the tessellation factors to the graphics memory 210 and the patch fetcher 234 bypasses reading the tessellation factors from the graphics memory 210 in response to receiving the message. In response to detecting that at least the threshold percentage of the tessellation factors for the thread group are the same, but are not equal to zero or one, the hull shader stage 233 writes a single instance of the value of the majority of tessellation factors to the graphics memory 210 and sends a message to the patch fetcher 234 indicating that the single value of the tessellation factors stored at the graphics memory 210 applies to all of the patches of the thread group.

Figure 3:
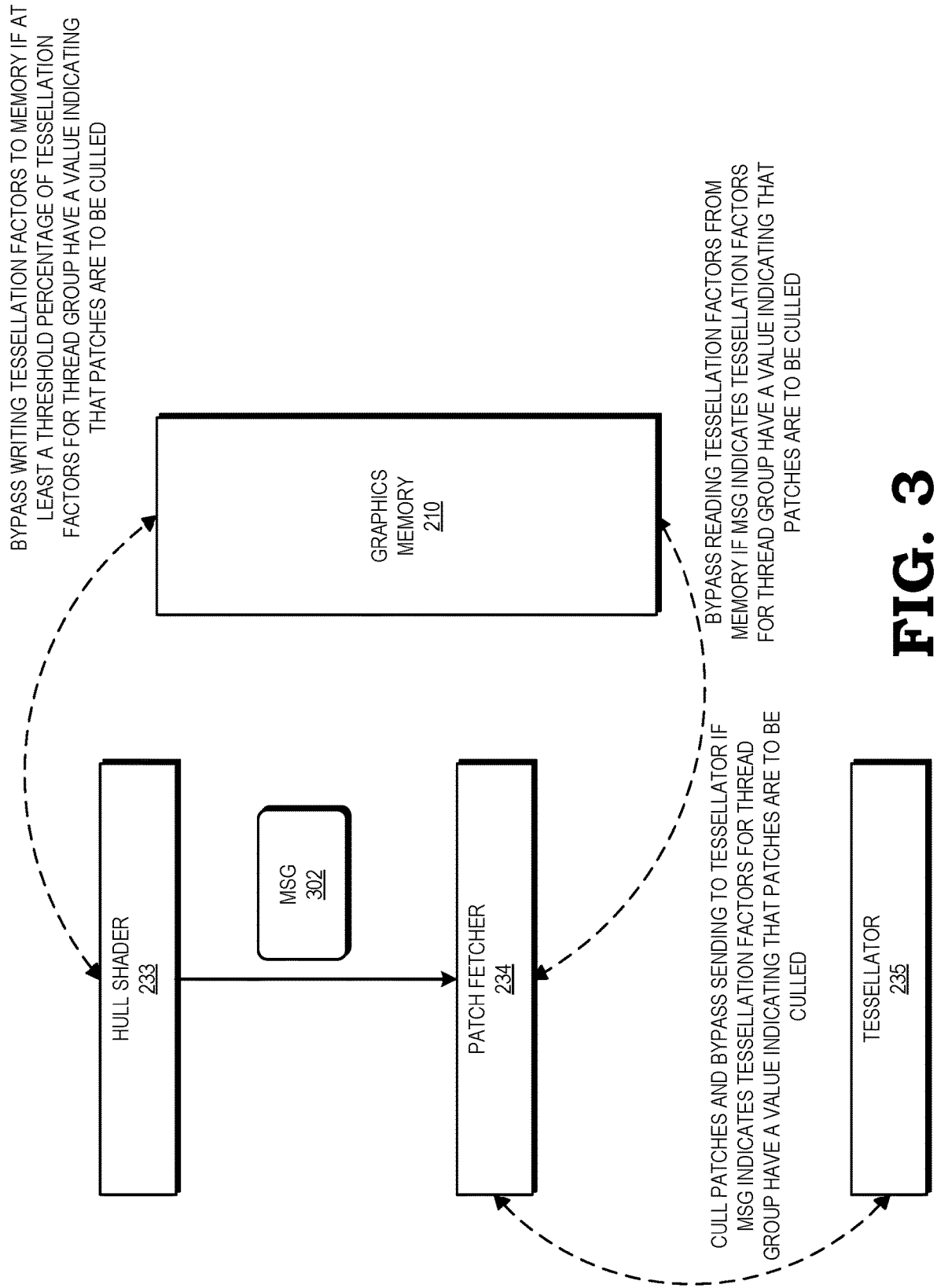
FIG. 3 depicts a hull shader of the graphics pipeline of FIG. 2 bypassing writing tessellation factors to memory and sending an indication to a patch fetcher of the graphics pipeline in response to detecting that at least a threshold percentage of tessellation factors for a thread group have a value indicating that patches of the thread group are to be culled in accordance with some embodiments.

FIG. 3 depicts the hull shader stage 233 of the graphics pipeline of FIG. 2 bypassing writing tessellation factors to the graphics memory 210 and sending an indication to a patch fetcher 234 of the graphics pipeline that all tessellation factors for a thread group have a value indicating that the patches of the thread group are to be culled in accordance with some embodiments. In response to the hull shader stage 233 detecting that at least the threshold percentage of the tessellation factors for the patches of a thread group have a value indicating that the patches of the thread group are to be culled (e.g., have a value of zero), the hull shader stage 233 bypasses writing the tessellation factors for the thread group to the graphics memory 210. The hull shader stage 233 also sends a message 302 to the patch fetcher 234 indicating that all of the tessellation factors for all of the patches of the thread group have a value indicating that the patches of the thread group are to be culled (e.g., are equal to zero). In response to receiving the message 302, the patch fetcher 234 bypasses reading tessellation factors for the thread group from the graphics memory 210. Because a tessellation factor of zero culls patches, the patch fetcher 234 additionally discards the patches of the thread group rather than passing them to the tessellator stage (not shown).

Figure 4:
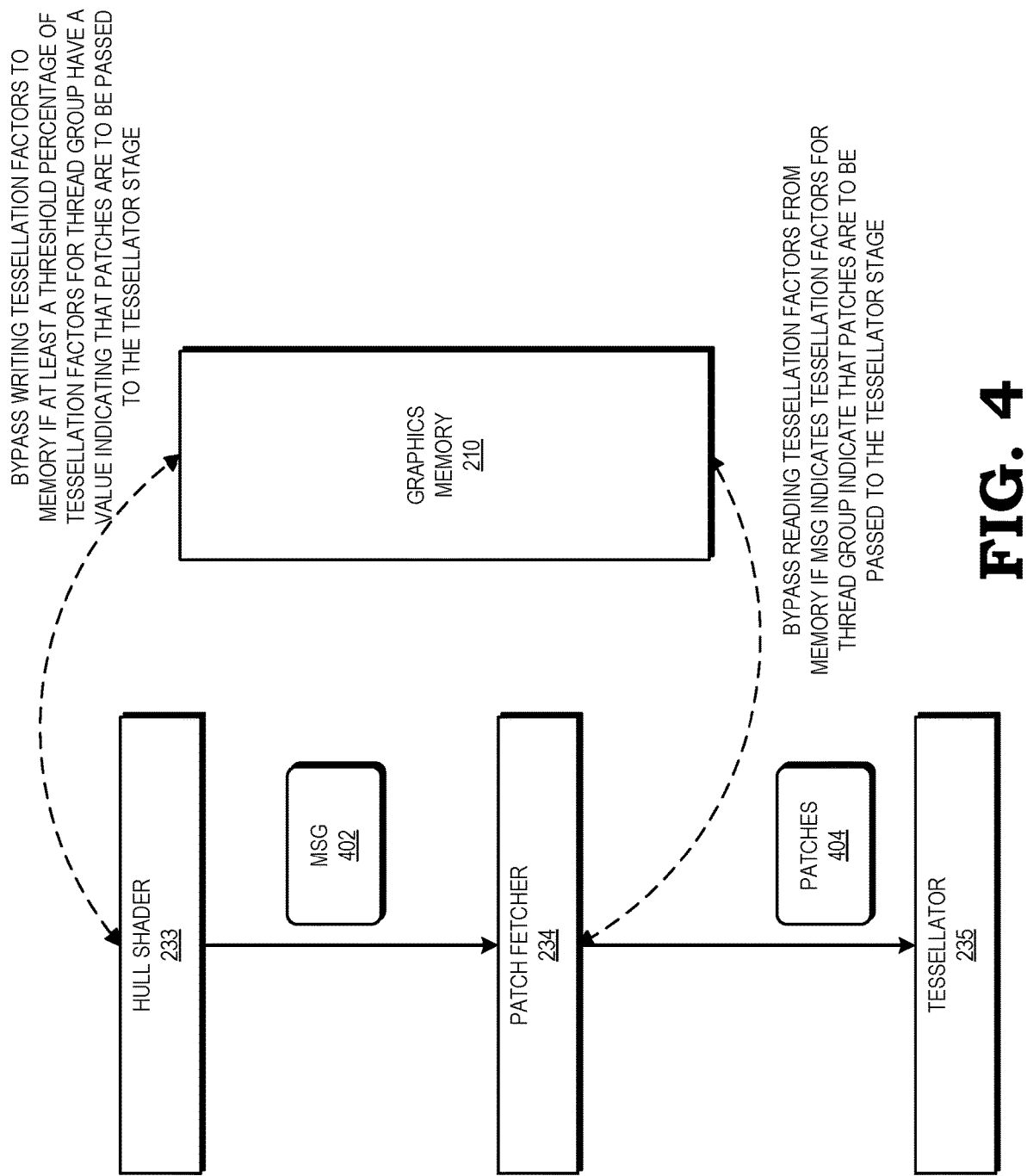
FIG. 4 depicts a hull shader of the graphics pipeline of FIG. 2 bypassing writing tessellation factors to memory and sending an indication to a patch fetcher of the graphics pipeline in response to detecting that at least a threshold percentage tessellation factors for a thread group have a value indicating that patches of the thread group are to be passed to a tessellator stage of the graphics pipeline in accordance with some embodiments.

FIG. 4 depicts the hull shader stage 233 of the graphics pipeline of FIG. 2 bypassing writing tessellation factors to the graphics memory 210 and sending an indication to a patch fetcher 234 of the graphics pipeline in response to detecting that at least the threshold percentage of the tessellation factors for a thread group have a value indicating that the patches of the thread group are to be passed to the tessellator stage in accordance with some embodiments. In response to the hull shader stage 233 detecting that at least the threshold percentage of the tessellation factors for the patches of a thread group have a value indicating that the patches of the thread group are to be passed to the tessellator stage (e.g., have a value of one), the hull shader stage 233 bypasses writing the tessellation factors for the thread group to the graphics memory 210. The hull shader stage 233 also sends a message 402 to the patch fetcher 234 indicating that the tessellation factors for the patches of the thread group have a value indicating that the patches of the thread group are to be passed to the tessellator stage (e.g., are equal to one). In response to receiving the message 402, the patch fetcher 234 bypasses reading tessellation factors for the thread group from the graphics memory 210. The patch fetcher 234 additionally unrolls the patches of the thread group and passes them to the tessellator (not shown).

Figure 5:
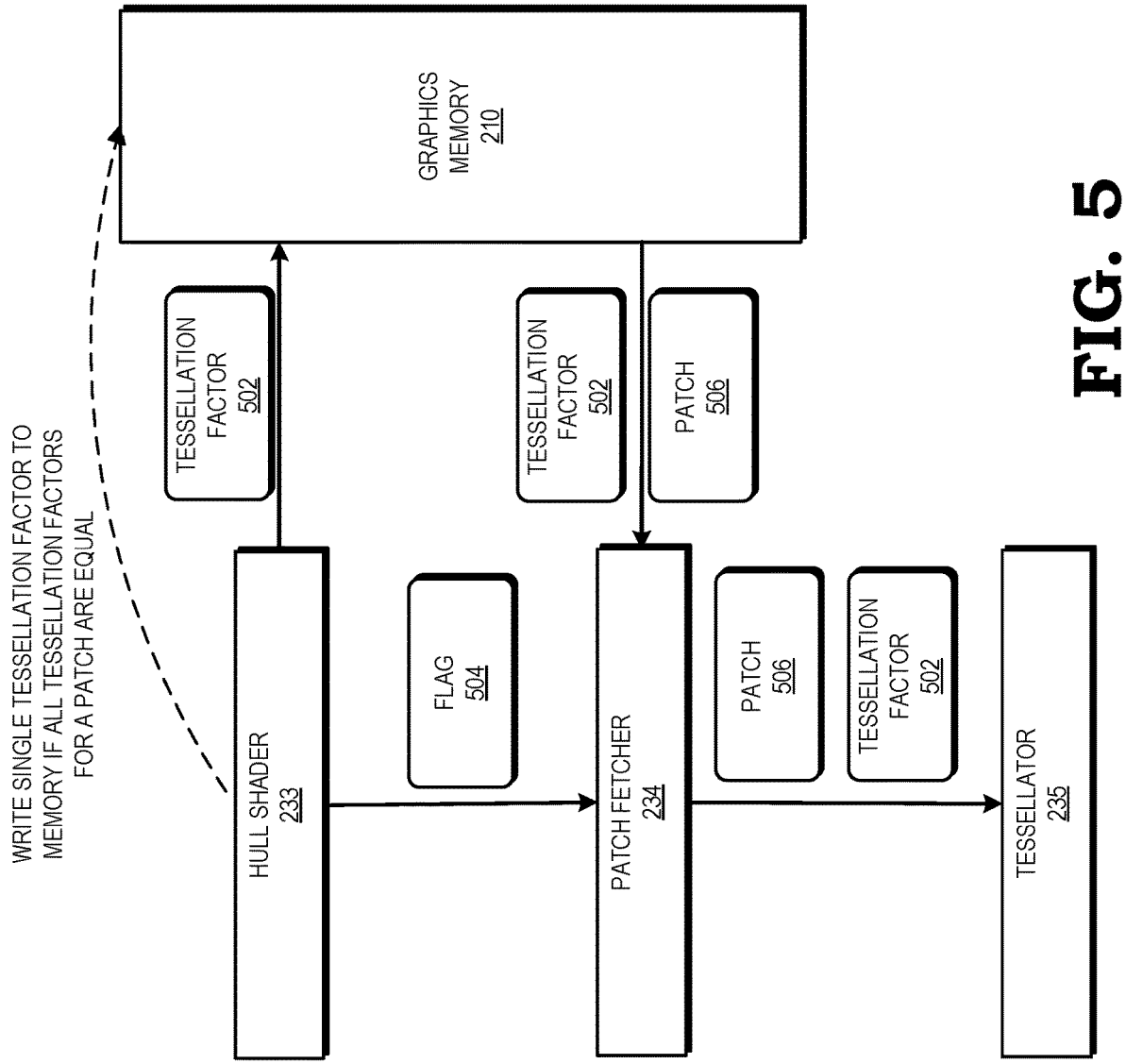
FIG. 5 depicts a hull shader of the graphics pipeline of FIG. 2 writing a single instance of a tessellation factor to memory and sending an indication to a patch fetcher of the graphics pipeline that the single tessellation factor applies for all tessellation factors for a patch in accordance with some embodiments.

FIG. 5 depicts the hull shader stage 233 of the graphics pipeline of FIG. 2 writing a single instance of a value of a tessellation factor to the graphics memory 210 and sending an indication to a patch fetcher 234 of the graphics pipeline that the single tessellation factor value applies for all tessellation factors for a patch in accordance with some embodiments. In response to detecting that all of the tessellation factors associated with a patch 506 have the same value, the hull shader stage 233 bypasses writing all of the tessellation factors for the patch to the graphics memory 210. Instead, the hull shader stage 233 writes a single instance of the tessellation factor 502 to the graphics memory 210 and sends a flag 504 to the patch fetcher 234 indicating that the single instance of the tessellation factor value applies to all tessellation factors corresponding to the patch 506. In response to receiving the flag 504, the patch fetcher 234 reads the patch 506 and the single instance of the tessellation factor 502 from the graphics memory 210. The patch fetcher 234 applies to the tessellation factor 502 to all tessellation factors corresponding to the patch 506 and provides the patch 506 and the tessellation factor 502 to the tessellator stage 235, which uses the tessellation factor to generate the final primitives.

Figure 6:
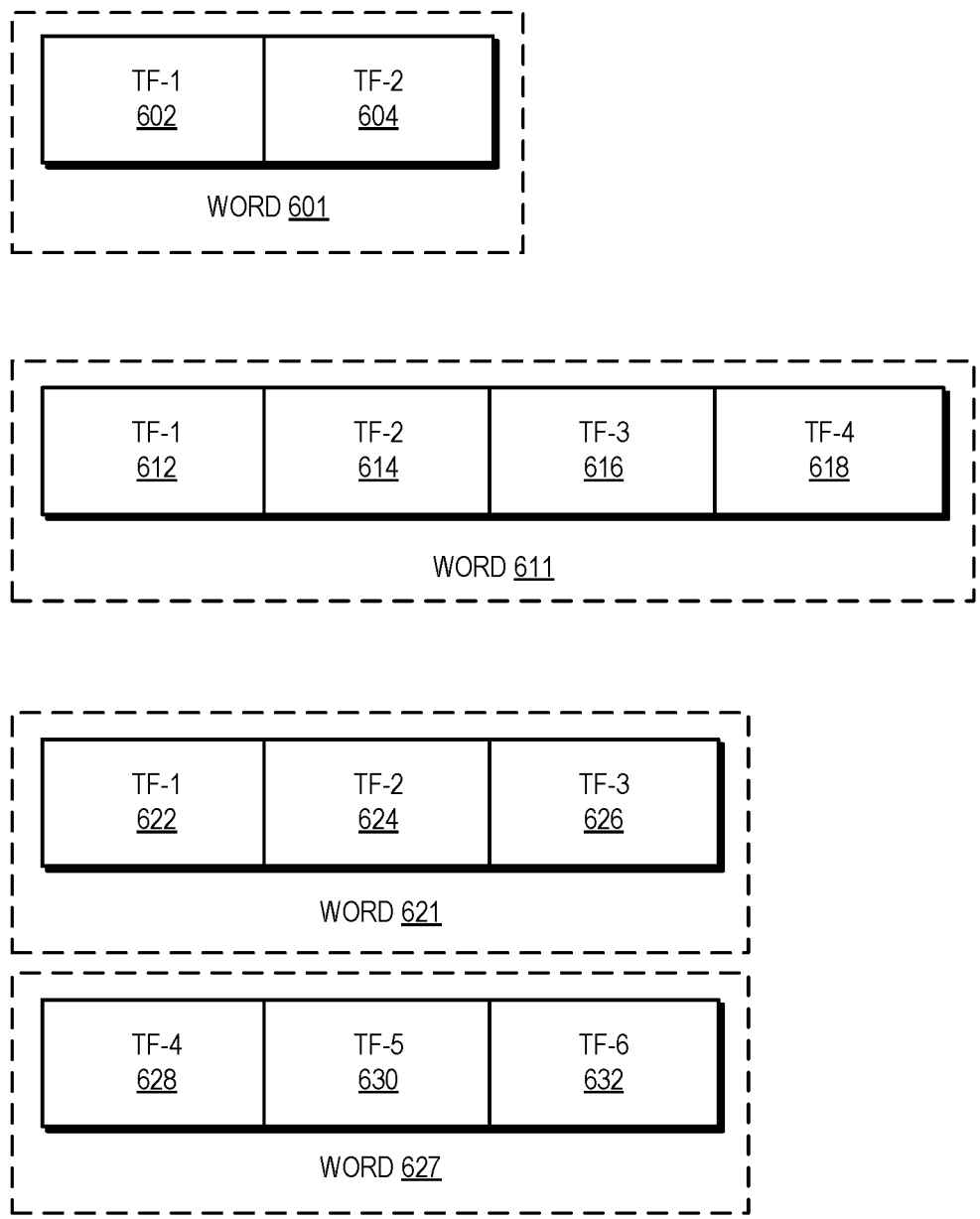
FIG. 6 depicts a plurality of tessellation factors for a patch packaged in a single word in accordance with some embodiments.

FIG. 6 depicts a plurality of tessellation factors for a patch packaged in a single word in accordance with some embodiments. In some embodiments, a hull shader stage writes tessellation factors to a graphics memory in 32-bit words. Each tessellation factor has a value between 0 and 64. Accordingly, each tessellation factor can be written using 8 bits. To reduce the number of words being written to and read from the graphics memory 210, in some embodiments the hull shader stage (not shown) packages a plurality of tessellation factors in a single word. For example, an isoline patch has two tessellation factors. The hull shader stage writes to the graphics memory (not shown) a single word 601 including a first tessellation factor TF-1 602 and a second tessellation factor TF-2 604 corresponding to an isoline patch. As another example, a triangle patch has four tessellation factors. The hull shader stage writes to the graphics memory a single word 611 including a first tessellation factor TF-1 612, a second tessellation factor TF-2 614, a third tessellation factor TF-3 616, and a fourth tessellation factor TF-4 618 corresponding to a triangle patch. Similarly, a quad patch has six tessellation factors. Because all six 8-bit tessellation factors cannot fit in a single 32-bit word, the hull shader stage packages the six tessellation factors corresponding to a quad patch into two words. For example, the hull shader stage writes to the graphics memory a first word 621 including a first tessellation factor TF-1 622, a second tessellation factor TF-2 624, and a third tessellation factor TF-3 626, and a second word 627 including a fourth tessellation factor TF-4 628, a fifth tessellation factor TF-5 630, and a sixth tessellation factor TF-6 632 corresponding to a quad patch. Thus, the hull shader stage reduces the number of words of tessellation factors being written to and read from the graphics memory from two to one (in the case of an isoline patch), from four to one (in the case of a triangle patch), and from six to two (in the case of a quad patch).

Figure 7:
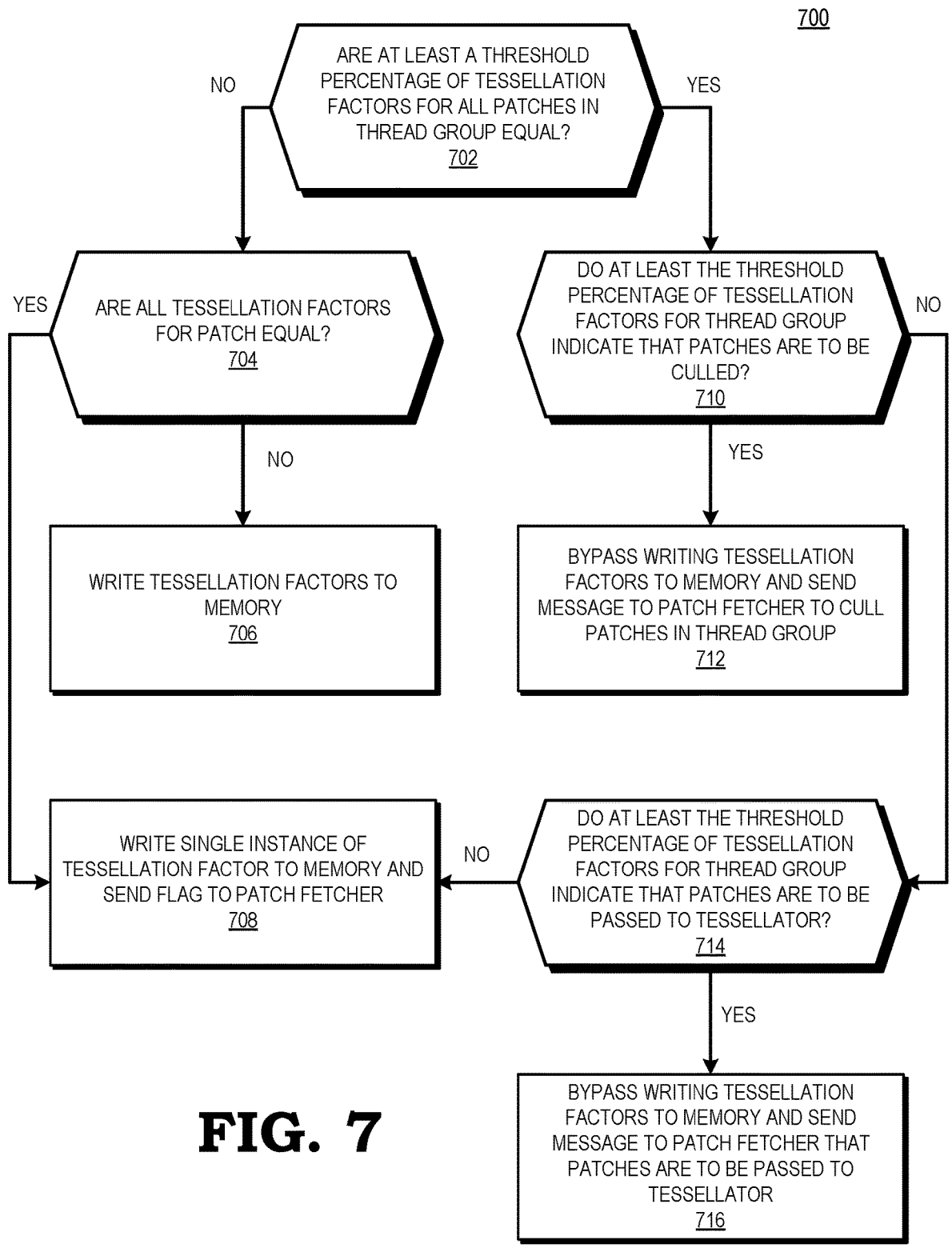
FIG. 7 is a flow diagram illustrating a method for bypassing writing at least a subset of tessellation factors to memory in accordance with some embodiments.

FIG. 7 is a flow diagram illustrating a method 700 for bypassing writing at least a subset of tessellation factors to memory in accordance with some embodiments. In some embodiments, the method is implemented by the graphics pipeline 114 of FIG. 1 or the graphics processing pipeline 200 of FIG. 2.

At block 702, the hull shader stage 233 determines whether at least a threshold percentage of the tessellation factors for all patches of a thread group have equal values. If, at block 702, the hull shader stage 233 determines that at least the threshold percentage of the tessellation factors for all patches of the thread group do not have equal values, the method flow continues to block 704. At block 704, the hull shader stage 233 determines whether all of the tessellation factors for a patch of the thread group have equal values. If, at block 704, the hull shader stage 233 determines that all of the tessellation factors for the patch do not have equal values, the method flow continues to block 706. At block 706, the hull shader stage 233 writes the tessellation factors for the patch to the graphics memory 210. In some embodiments, the hull shader stage 233 writes a plurality of tessellation factors corresponding to the patch in a single word. For example, for an isoline patch having two tessellation factors, the hull shader stage 233 writes both tessellation factors for the isoline patch in a single word. For a triangle patch having four tessellation factors, the hull shader stage 233 writes all four tessellation factors for the triangle in a single word. For a quad patch having six tessellation factors, the hull shader stage 233 writes, e.g., the first three tessellation factors for the quad patch in a first word and the second three tessellation factors for the quad patch in a second word.

If, at block 704, the hull shader stage 233 determines that at least the threshold percentage of the tessellation factors for the patch have equal values, the method flow continues to block 708. At block 708, the hull shader stage 233 writes a single instance of the tessellation factor to the graphics memory 210 and send a flag 504 to the patch fetcher indicating that the single instance of the tessellation factor applies for all tessellation factors corresponding to the patch.

If, at block 702, the hull shader stage 233 determines that at least the threshold percentage of the tessellation factors for all patches of the thread group have equal values, the method flow continues to block 710. At block 710, the hull shader stage 233 determines whether at least the threshold percentage of the tessellation factors for all patches of the thread group have a value that indicates that the patches of the thread group are to be culled. If, at block 710, the hull shader stage 233 determines that at least the threshold percentage of the tessellation factors for all of the patches of the thread group have a value that indicates that the patches of the thread group are to be culled, the method flow continues to block 712. At block 712, the hull shader stage 233 bypasses writing the tessellation factors for the thread group to the graphics memory 210 and sends a message 302 to the patch fetcher 234 indicating that the tessellation factors for the thread group have a value that indicates that the patches of the thread group are to be culled. In response to receiving the message 302, the patch fetcher 234 bypasses reading tessellation factors for the thread group from the graphics memory 210 and culls (discards) the patches of the thread group.

At block 710, if the hull shader stage 233 determines that at least the threshold percentage of the tessellation factors for all of patches of the thread group do not have a value that indicates that the patches of the thread group are to be culled, the method flow continues to block 714. At block 714, the hull shader stage 233 determines whether at least the threshold percentage of the tessellation factors for all of patches of the thread group have a value that indicates that the patches of the thread group are to be passed to the tessellator stage 235. If, at block 714, the hull shader stage determines that at least the threshold percentage of the tessellation factors for all of the patches of the thread group have a value that indicates that the patches of the thread group are to be passed to the tessellator stage 235, the method flow continues to block 716. At block 716, the hull shader stage 233 bypasses writing the tessellation factors for the patches of the thread group to the graphics memory 210 and sends a message 402 to the patch fetcher 234 indicating that all of the tessellation factors for all of the patches of the thread group have a value that indicates that the patches of the thread group are to be passed to the tessellator stage 235. In response to receiving the message 402, the patch fetcher 234 unrolls the patches from the graphics memory 210 and provides the patches to the tessellator stage 235. If, at block 714, the hull shader stage 233 determines that at least the threshold percentage of the tessellation factors for all of the patches of the thread group do not have a value that indicates that the patches of the thread group are to be passed to the tessellator stage 235, the method flow continues to block 708. In this case, because the hull shader stage has determined that at least the threshold percentage of the tessellation factors for all of the patches of the thread group have equal values, at block 706, the hull shader writes a single instance of the most common tessellator factor value to the graphics memory 210 and sends a flag 504 to the patch fetcher indicating that the single tessellator factor stored at the graphics memory 210 applies for all of the tessellation factors for all of the patches of the thread group.

A computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium in some embodiments is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device are not necessarily required, and that one or more further activities could be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that could cause any benefit, advantage, or solution to occur or become more pronounced are not to be construed as a critical, required, or essential feature of any or all the claims. Moreover, the particular embodiments disclosed above are illustrative only, as the disclosed subject matter can be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above can be altered or modified and all such variations are considered within the scope of the disclosed subject matter. Accordingly, the protection sought herein is as set forth in the claims below.

What is claimed is:

1. A method comprising:
   in response to detecting, at a hull shader stage of a graphics pipeline of a graphics processing unit (GPU), that at least a threshold percentage of tessellation factors corresponding to a plurality of patches in a thread group has the same value,
   bypassing writing at least a subset of the tessellation factors corresponding to the plurality of patches to a graphics memory of the graphics pipeline.

2. The method of claim 1, further comprising:
   in response to detecting, at the hull shader stage, that at least the threshold percentage of tessellation factors indicate that the plurality of patches are to be culled, sending a message to a patch fetcher of the graphics pipeline indicating that the plurality of patches are to be culled;
   at the patch fetcher, bypassing reading from the graphics memory the tessellation factors corresponding to the plurality of patches in response to receiving the message; and
   discarding, at the patch fetcher, the plurality of patches.

3. The method of claim 1, further comprising:
in response to detecting, at the hull shader stage, that at least the threshold percentage of tessellation factors corresponding to the plurality of patches indicate that the plurality of patches are to be passed to a tessellator stage of the graphics pipeline, sending a message to a patch fetcher of the graphics pipeline that all of the tessellation factors corresponding to the plurality of patches indicate that the plurality of patches are to be passed to a tessellator stage of the graphics pipeline;
bypassing writing the tessellation factors to the graphics memory;
at the patch fetcher, bypassing reading from the graphics memory the tessellation factors corresponding to the plurality of patches in response to receiving the message; and
sending the plurality of patches to the tessellator stage.

4. The method of claim 1, further comprising:
in response to detecting, at the hull shader stage, that at least a threshold percentage of the tessellation factors corresponding to a patch of the plurality of patches have a same value that neither indicates that the plurality of patches are to be culled or that the plurality of patches are to be passed to a tessellator stage of the graphics pipeline, writing the value of the tessellation factors once to the graphics memory and sending a flag to a patch fetcher of the graphics pipeline indicating that the value applies for all tessellation factors corresponding to the patch;
in response to receiving the flag at the patch fetcher, reading the value from the graphics memory; and
applying the value for all tessellation factors corresponding to the patch.

5. The method of claim 1, further comprising:
in response to detecting, at the hull shader stage, that all of the tessellation factors corresponding to a patch of the plurality of patches are not the same, writing at least one word to the graphics memory, the at least one word comprising a plurality of the tessellation factors corresponding to the patch with an indication that the at least one word comprises the plurality of the tessellation factors.

6. The method of claim 5, wherein the patch comprises an isoline patch and the at least one word comprises two tessellation factors.

7. The method of claim 5, wherein the patch comprises a triangle patch and the at least one word comprises four tessellation factors.

8. The method of claim 5, wherein the patch comprises a quad patch and the at least one word comprises six tessellation factors.

9. The method of claim 5, further comprising:
performing integer compression on the tessellation factors to generate compressed tessellation factors; and
writing the compressed tessellation factors to the graphics memory.

10. A method comprising:
in response to receiving, at a patch fetcher of a graphics pipeline of a graphics processing unit (GPU), a message indicating that at least a threshold percentage of tessellation factors corresponding to a plurality of patches in a thread group have the same value, bypassing reading at least a subset of the tessellation factors corresponding to the plurality of patches from a graphics memory of the graphics pipeline.

11. The method of claim 10, further comprising:
in response to receiving, at the patch fetcher, an indication that at least the threshold percentage of the tessellation factors corresponding to the plurality of patches have a value indicating that the plurality of patches are to be culled, bypassing reading from the graphics memory the tessellation factors corresponding to the plurality of patches; and
discarding, at the patch fetcher, the plurality of patches.

12. The method of claim 10, further comprising:
in response to receiving, at the patch fetcher, an indication that at least the threshold percentage of the tessellation factors corresponding to the plurality of patches have a value indicating that the plurality of patches are to be passed to a tessellator stage of the graphics pipeline, sending the plurality of patches to the tessellator stage.

13. The method of claim 10, further comprising:
in response to receiving, at the patch fetcher, a flag indicating that a single value at the graphics memory applies for all tessellation factors corresponding to a patch, reading the value from the graphics memory; and
applying the value for all tessellation factors corresponding to the patch.

14. The method of claim 10, further comprising:
in response to receiving, at the patch fetcher, an indication that at least one word stored at the graphics memory comprises a plurality of tessellation factors corresponding to a patch, reading the at least one word from the graphics memory and applying the plurality of tessellation factors to the patch.

15. A graphics processing unit (GPU), comprising:
a patch fetcher configured to read tessellation factors stored at a graphics memory; and
a hull shader stage configured to:
bypass writing to the graphics memory at least a subset of tessellation factors corresponding to a plurality of patches in a thread group in response to detecting that at least a threshold percentage of the tessellation factors have the same value.

16. The GPU of claim 15, wherein:
the hull shader stage is further configured to indicate to the patch fetcher that all of the tessellation factors corresponding to the plurality of patches have a value indicating that the plurality of patches are to be culled in response to detecting that at least the threshold percentage of the tessellation factors have a value indicating that the plurality of patches are to be culled; and
the patch fetcher is further configured to:
bypass reading from the graphics memory the tessellation factors corresponding to the plurality of patches in response to receiving the indication; and
discard the plurality of patches.

17. The GPU of claim 15, further comprising:
a tessellator stage;
wherein the hull shader stage is further configured to indicate to the patch fetcher that all of the tessellation factors corresponding to the plurality of patches have a value indicating that the plurality of patches are to be passed to the tessellator stage in response to detecting that at least the threshold percentage of the tessellation factors corresponding to the plurality of patches have a value indicating that the plurality of patches are to be passed to the tessellator stage; and
wherein the patch fetcher is further configured to provide the plurality of patches to the tessellator stage of the GPU in response to receiving the indication.

18. The GPU of claim 15, wherein:
the hull shader stage is further configured to write the value of the tessellation factors once to the graphics memory and send a flag to the patch fetcher indicating that the value applies for all tessellation factors corresponding to the patch in response to detecting that all of the tessellation factors corresponding to a patch of the plurality of patches have a same value that neither indicates that the plurality of patches are to be culled or that the plurality of patches are to be passed to a tessellator stage; and
the patch fetcher is further configured to read the value from the graphics memory and apply the value for all tessellation factors corresponding to the patch in response to receiving the flag.

19. The GPU of claim 15, wherein:
the hull shader stage is further configured to write at least one word to the graphics memory, the at least one word comprising a plurality of the tessellation factors corresponding to the patch with an indication that the at least one word comprises the plurality of the tessellation factors in response to detecting that all of the tessellation factors corresponding to a patch of the plurality of patches are not the same.

20. The GPU of claim 19, wherein the patch comprises an isoline patch and the at least one word comprises two tessellation factors.

* * * * *